US009646264B2

(12) United States Patent
Baughman

(10) Patent No.: US 9,646,264 B2
(45) Date of Patent: May 9, 2017

(54) RELEVANCE-WEIGHTED FORECASTING BASED ON TIME-SERIES DECOMPOSITION

(71) Applicant: International Business Machines Corporation, Armonk, NY (US)

(72) Inventor: Aaron K. Baughman, Silver Spring, MD (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 28 days.

(21) Appl. No.: 14/631,065

(22) Filed: Feb. 25, 2015

(65) Prior Publication Data

US 2016/0247069 A1 Aug. 25, 2016

(51) Int. Cl.
*G06N 99/00* (2010.01)

(52) U.S. Cl.
CPC .................. *G06N 99/005* (2013.01)

(58) Field of Classification Search
None
See application file for complete search history.

(56) References Cited

U.S. PATENT DOCUMENTS

| 6,701,028 | B1 | 3/2004 | Crandall |
| H2109 | H | 9/2004 | Tsui |
| 6,816,786 | B2 | 11/2004 | Intriligator |
| 7,610,214 | B1 | 10/2009 | Dwarakanath et al. |
| 8,233,730 | B1 | 7/2012 | Namboodiri et al. |
| 8,270,671 | B1 | 9/2012 | Medasani et al. |
| 8,433,098 | B1 | 4/2013 | Medasani et al. |
| 2002/0186895 | A1* | 12/2002 | Gloersen ............... G06F 17/18 382/285 |
| 2004/0015894 | A1* | 1/2004 | Lange .................. G06N 99/005 7/138 |
| 2006/0217939 | A1* | 9/2006 | Nakata .................... G06F 17/18 702/189 |

(Continued)

FOREIGN PATENT DOCUMENTS

| CN | 1592852 A | 3/2005 |
| WO | 2014055690 A1 | 4/2014 |

OTHER PUBLICATIONS

Papadimitriou et al; Adaptive, unsupervised stream mining, The VLDB Journal (2004) 13: 222-239 / Digital Object Identifier (DOI), 222-239.

(Continued)

*Primary Examiner* — Alan Chen
(74) *Attorney, Agent, or Firm* — Garg Law Firm, PLLC; Rakesh Garg; Christopher K. McLane

(57) ABSTRACT

An input time-series is decomposed into a set of constituent frequencies. For each constituent frequency in a subset of the set of constituent frequencies, a corresponding forecasting model is selected in a subset from a set of forecasting models. From a set of component forecasts produced by the subset of forecasting models, a subset of component forecasts is selected. A component forecast in the subset of component forecasts is selected according to a component forecast selection condition. The subset of component forecasts is output to revise the forecast selection condition. A revised forecast selection condition increases a relevance of a future subset of component forecasts.

25 Claims, 8 Drawing Sheets

(56) References Cited

U.S. PATENT DOCUMENTS

2010/0092028 A1* 4/2010 Huang .................... G06F 17/14 382/100
2016/0132775 A1* 5/2016 Baughman ............... G06N 5/04 706/12

OTHER PUBLICATIONS

Kao et al; Automatic Heart Sound Analysis with Short-Time Fourier Transform and Support Vector Machines, 2009, IEEE, 188-191.

Krishnamurthy et al; Friendly Neighbors Method for Unsupervised Determination of Gene Significance in Time-courseMicroarray Data, Proceedings of the Fourth IEEE Symposium on Bioinformatics and Bioengineering (BIBE'04) 0-7695-2173-8/04 $ 20.00 © 2004 IEEE.

Stone et al; GPU-Accelerated Computation and Interactive Display of Molecular Orbitals, GPU Computing Gems. DOI: 10.1016/B978-0-12-384988-5.00001-2, 2011 NVIDIA Corporation and Wen-mei W. Hwu. Published by Elsevier Inc.

Zhi-Hui et al; Short-term Load Forecasting Based on EMD and SVM, vol. 33 No. 5, May 2007.

Anonymous; Method and system for orchestrating disks workload based on wavelet analysis, Oct. 9, 2014.

Wang et al; A Prediction Method and Its Application, IEEE, 2009.

Lee et al; Towards Discovering Emerging Technologies Based on Decision Tree, 2011 IEEE International Conferences on Internet of Things, and Cyber, Physical and Social Computing.

Cardwell; The Best Damn Cybercrime and Digital Forensics Book Period, 2007 by Elsevier, Inc.

Galar et al; RUL prediction using moving trajectories between SVM hyper planes, IEEE, 2012.

Barry et al; Modern Embedded Computing Designing Connected, Pervasive, Media-Rich Systems, 2012.

Das et al; Handbook on Securing Cyber-Physical Critical Infrastructure, 2012.

Yang; The forecast of power demand cycle turning points based on ARMA, Second International Workshop on Knowledge Discovery and Data Mining, IEEE, 2009.

* cited by examiner

RELEVANCE-WEIGHTED FORECASTING BASED ON TIME-SERIES DECOMPOSITION

TECHNICAL FIELD

The present invention relates generally to a method, system, and computer program product for forecasting future events. More particularly, the present invention relates to a method, system, and computer program product for relevance-weighted forecasting based on time-series decomposition.

BACKGROUND

A predictive model (also known as a forecaster, a forecasting model, or an autoregressive model) is a software-implemented model of a system, process, or phenomenon, usable to forecast a value, output, or outcome expected from the system, process, or phenomenon. The system, process, or phenomenon that is modeled is collectively and interchangeably referred to hereinafter as a "process" unless specifically distinguished where used.

A simulation is a method of computationally looking ahead in the future of the execution of the process to predict one or more events that can be expected to occur in the process at that future time. A predicted event is a value, output, or outcome of the process at the end of a look-ahead period configured in the simulation.

A variable that affects an outcome of a process is called a factor or a feature. A predicted event or an outcome of a process is dependent upon, affected by, or otherwise influenced by a set of one or more factors. A factor can be independent, to wit, independent of and not affected by other factors participating in a given model. A factor can be dependent upon a combination of one or more other independent or dependent factors.

A predictive model has to be trained before the model can reliably predict an event in the future of the process with a specified degree of probability or confidence. Usually, but not necessarily, the training data includes past or historical outcomes of the process. The training process adjusts a set of one or more parameters of the model.

A predictive model can also self-train using a machine learning process. The predictive model selects some of its own prior outputs depending upon some combination of the validity, accuracy, repeatability, and reliability of those prior outputs. The predictive model then consumes the selected prior outputs as training inputs, to improve some combination of the validity, accuracy, repeatability, and reliability of future outputs.

Data emitted over a period by a data source is called a time-series. In statistics, signal processing, and many other fields, a time-series is a sequence of data points, measured typically at successive times, spaced according to uniform time intervals, other periodicity, or other triggers.

Time-series analysis is a method of analyzing time-series, for example to understand the underlying context of the data points, such as where they came from or what generated them. As another example, time-series analysis may analyze a time-series to make forecasts or predictions. Time-series forecasting is the use of a forecasting model to forecast future events based on known past events, to wit, to forecast future data points before they are measured. An example in econometrics is the opening price of a share of stock based on the stock's past performance, which uses time-series forecasting analytics.

Time-series forecasting uses one or more forecasting models to regress on independent factors to produce a dependent factor. For example, if Tiger Woods has been playing golf very quickly, the speed of play is an example of an independent factor. A forecasting model regresses on historical data to predict the future play rates. The future play rate is a dependent factor.

Time-series data is not always uniformly distributed and often includes anomalies. For example, if the data pertains to a golfing tournament, the events that occur in the tournament are reflected in the data. The type, spacing, peaking, repetition rate, intensity, duration, and other characteristics of the events are dependent on a variety of factors, and are therefore non-uniformly distributed in the data. A state-based forecasting model accounts for the anomalies in an input time-series when producing a forecast.

The non-uniformity of the distribution of an event in time-series data is referred to herein as an anomaly. For example, that an event in the example golfing data will have a certain value is dependent upon a time of day when that event is occurring, the slope of the course, a weather condition at the time, a skill level of the player, and many other factors that introduce anomalies in the event's data. For example, the event may occur more regularly during midday as compared to evenings; or the event may occur more predictably if a skilled player is playing as compared to when a novice is playing; and so on.

SUMMARY

The illustrative embodiments provide a method, system, and computer program product for relevance-weighted forecasting based on time-series decomposition. An embodiment includes a method for forecasting based on time-series decomposition. The embodiment decomposes, using a processor and a memory, an input time-series into a set of constituent frequencies. The embodiment selects, for each constituent frequency in a subset of the set of constituent frequencies, a corresponding forecasting model in a subset from a set of forecasting models. The embodiment selects, from a set of component forecasts produced by the subset of forecasting models, a subset of component forecasts, wherein a component forecast in the subset of component forecasts is selected according to a component forecast selection condition. The embodiment outputs the subset of component forecasts to revise the forecast selection condition, wherein a revised forecast selection condition increases a relevance of a future subset of component forecasts.

Another embodiment further receives from an application a relevance weight, wherein the relevance weight is the component forecast selection condition.

In another embodiment, a user revises a previous relevance weight to form the relevance weight.

Another embodiment further receives from an application an accuracy weight, wherein the accuracy weight is the component forecast selection condition.

In another embodiment, a user revises a previous accuracy weight to form the accuracy weight.

Another embodiment further receives from an application a relevance weight and an accuracy weight, wherein the component forecast selection condition is a function of the relevance weight and the accuracy weight.

Another embodiment further produces, by providing a constituent frequency from the subset of constituent frequencies as an input to a corresponding forecasting model in the subset of forecasting models, a component forecast in the set of component forecasts.

Another embodiment further selects the subset of the constituent frequencies according to a selection condition, wherein the selection condition specifies a minimum amplitude a frequency has to have in order to be selected into the subset of the constituent frequencies.

Another embodiment further selects, for a first constituent frequency in the subset of the constituent frequencies, a first forecasting model that is configured to forecast when an anomaly is present in the first constituent frequency.

Another embodiment further transforms, as a part of decomposing, using Fourier transform, the input time-series, to detect a presence of a particular constituent frequency in the input time-series. The embodiment adds, responsive to the particular frequency being present in the input time-series, the particular frequency as a constituent frequency in the set of constituent frequencies.

Another embodiment further detects, as a part of the transforming, the presence of the frequency at an amplitude.

In another embodiment, the decomposing uses a waveform representation of the input time-series, and wherein the decomposing produces a set of component data of the input time-series such that the set of the component data can be represented as the set of constituent frequencies.

Another embodiment includes a computer program product for forecasting based on time-series decomposition.

Another embodiment includes a computer system for forecasting based on time-series decomposition.

Another embodiment includes an apparatus for forecasting based on time-series decomposition.

Another embodiment includes a forecasting environment for forecasting based on time-series decomposition.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
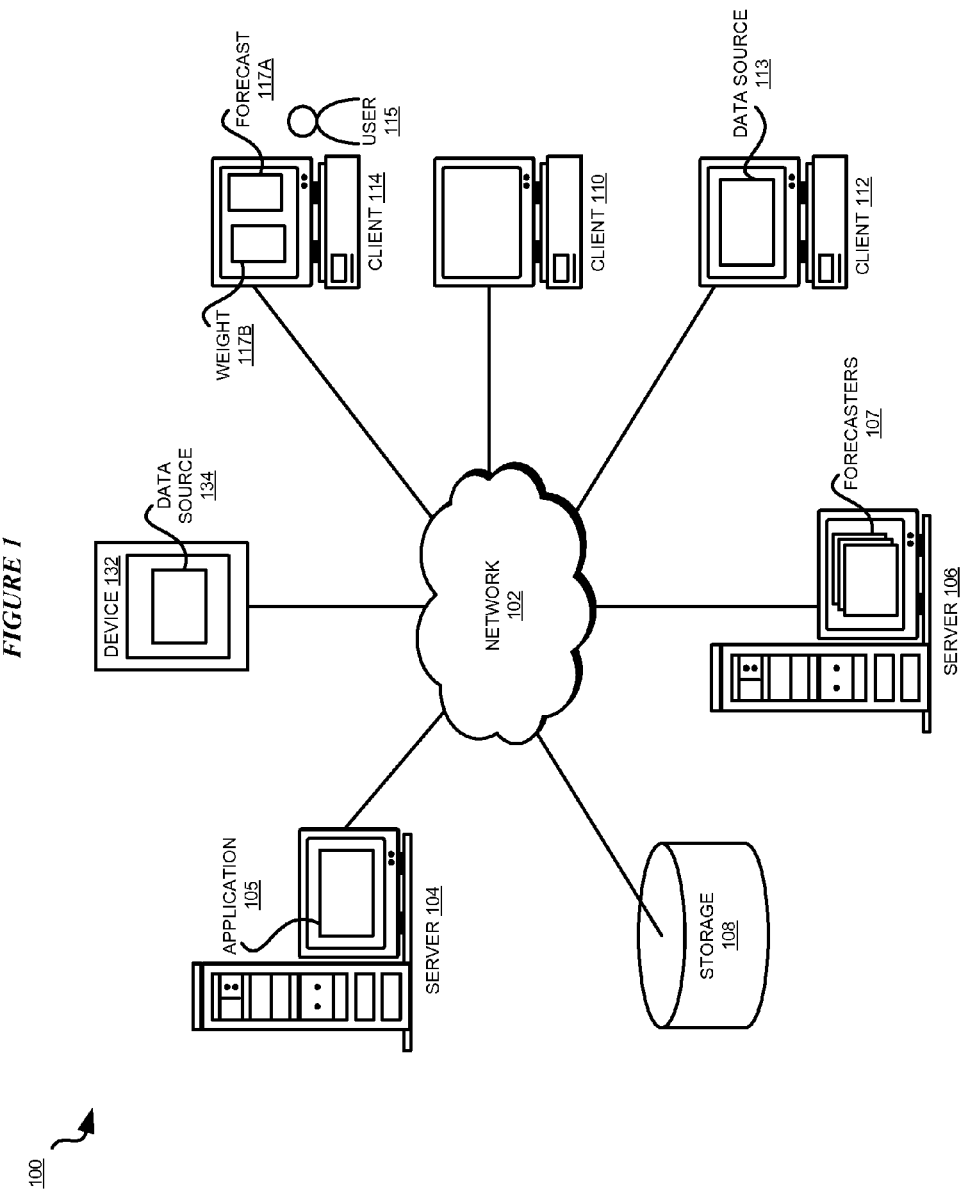
FIG. 1 depicts a block diagram of a network of data processing systems in which illustrative embodiments may be implemented.

The illustrative embodiments recognize that a time-series is often not a simple case of single-event data. In other words, several factors participate independently or in a dependent manner, subject to a variety of influences, to affect a tracked event, and produce a data point in the time-series. Thus, a time-series based on which a forecast is to be created is hardly ever representable as a clean waveform of a fixed frequency. Instead, most time-series which form inputs to forecasting models are a noisy combination of many waveforms of a variety of frequencies, harmonics, periodicities, seasonalities, and anomalies. Hereinafter, such a time-series is referred to as a complex time-series.

The illustrative embodiments further recognize that while a forecasted outcome may be influenced by a variety of factors and other influencers, a user who receives the forecast may not be interested in all such influences. The illustrative embodiments recognize that a forecast has to be not only accurate but also relevant to a consumer of the forecast.

The illustrative embodiments further recognize that relevance of a forecast does not have a static description either. What a user might favor as influences of interest today might very well change tomorrow. For example, a particular influencer, such as weather, may be a key influencer from the user's perspective during a golfing tournament today, but may not be a consideration when the same players are playing a different course on a different day.

Thus, the illustrative embodiments recognize that the presently available forecasting models seek to achieve accuracy in a forecast by accounting for the changes in the factors that influence the forecasted event, but an accurate forecast is not always relevant to what a consumer of the forecast desires to consider in the forecast. Furthermore, given a complex input time-series, it is not easy to isolate the effects of the individual influencers from the time-series. Thus, presently, a user cannot customize a forecast according to the influencers and other such considerations that are relevant to the user.

The illustrative embodiments used to describe the invention generally address and solve the above-described problems and other problems related to customizing a forecast. The illustrative embodiments provide a method, system, and computer program product for relevance-weighted forecasting based on time-series decomposition.

An embodiment receives a complex time-series. The embodiment decomposes the waveform representation of the complex time-series into the constituent simple waveforms, e.g., into a set of single frequency waveform components, which when combined approximate the complex time-series.

Based on a criterion, an embodiment selects a subset of the component frequencies. For example, one embodiment applies a Fourier transform function to the complex time-series to determine whether a certain frequency exists within the time-series. If the frequency exists as a component frequency, the transformation results in a larger than a threshold value, and vice versa. An embodiment further adjusts the transformation to determine whether a certain frequency exists with at least a specified amplitude within the time-series. If the frequency exists as a component frequency with at least the specified amplitude, the transformation results in a larger than a threshold value, and vice versa. Thus, an embodiment selects from the set of component frequencies those frequencies that meet or exceed a specified threshold value requirement. The selected frequencies form inputs to one or more forecasting models.

A set of forecasting models, or forecasters, is available for accept a time-series component frequency as an input and produce a corresponding forecast output. The forecast output corresponds to a data value that can be expected after a look-ahead period for whatever combination of factors or influencers is responsible for the decomposed and isolated frequency input.

In some cases, two or more frequencies are combined as an input to a forecaster. The resulting forecast is a data point that can be expected in the combined waveform of the input after the look-ahead period.

Furthermore, even if several forecasters are suitable for a given input time-series, such as for a selected input frequency, some forecasters are better than other forecasters. For example, one forecaster may be configured to forecast more accurately over a short look-ahead period than over a long look-ahead period, and vice-versa. Some other forecaster may be configured to produce forecasts over any look-ahead period with acceptable accuracy without being highly accurate for any particular look-ahead distance. Similarly, one forecaster may be particularly suitable for large amplitude variations in the input waveform whereas another forecaster may be more suitable when the waveform has minute amplitude changes.

As can be seen different forecasters can be configured to process the input time-series in different ways, to meet different forecasting requirements. These examples of forecasters are not intended to be limiting. From this disclosure, those of ordinary skill in the art will be able to conceive many other configurations of forecasters and the same are contemplated within the scope of the illustrative embodiments.

For each of the frequencies in the selected subset, an embodiment selects a suitable forecaster according to a specified criterion or condition. A set of forecasters is thus selected corresponding to the subset of frequencies. The embodiment supplies a frequency input to a corresponding forecaster to generate a forecast for a specified look-ahead period. For example, if the complex time-series has a periodicity or seasonality, that period or season, or a fraction thereof, may be selected as the look-ahead period.

An accuracy criterion or condition defines an acceptable level of accuracy in an output forecast of a forecaster. A relevance criterion or condition defines a degree of relevance of an output forecast of a forecaster relative to a consumer of the forecast. Different forecasters can have same or different accuracy criteria, relevance criteria, or a combination thereof.

An accuracy criterion for the forecast outputs of the selected forecasters may be initial set for one or more forecasters. For example, the accuracy condition may be set based on a priori knowledge of certain facts. Similarly, based on some a priori knowledge of a user's preferences, a relevance criterion may also be set in a similar manner for one or more forecasters. A user revises a relevance criterion in an iterative manner as described herein. An accuracy criterion can be revised through any suitable method.

From the set of forecast outputs produced by the selected set of forecasters, an embodiment selects those forecast outputs that satisfy the accuracy and relevance criteria applicable to a given iteration of the forecasting operation. The embodiment combines the selected subset of forecasts and combines them in the manner the corresponding input frequencies are combined in the complex time-series. The embodiment then produces an output forecast. The output forecast is usable as a forecast that corresponds to the previously set accuracy and relevance criteria.

One embodiment further presents the output forecast in a manner such that a user can adjust the relevance of one or more of the constituent forecast outputs that are combined therein. For example, via a user interface, the user supplies or changes weights to a constituent forecast output. The weight assigned to a constituent forecast output corresponds to a degree of relevance the user attributes to the input frequency corresponding to the constituent forecast output, or to one or more influencers associated with that input frequency.

In one embodiment, not only the selected subset of the forecast outputs, but all or a different subset of the forecast outputs are also made available to the user for weighting in a similar manner. An embodiment receives the revised relevance weights and applies the revised weights at the next iteration of the forecasting operation. In this way, an embodiment can react to the changing preferences or relevance of the various forecast outputs, and accommodate the changes by selecting different input frequencies, adjusting a manner of combining the frequency outputs of the various input frequencies, or a combination thereof.

A method of an embodiment described herein, when implemented to execute on a device or data processing system, comprises substantial advancement of the functionality of that device or data processing system in relevance-weighted forecasting based on time-series decomposition. For example, where prior-art is limited to adjusting an accuracy aspect of a forecast, an embodiment allows customizing the forecast according to the relevance of the forecast to its various consumers. Operating in a manner described herein, an embodiment significantly improves the utility of the forecast. Such manner of customizable forecasting is unavailable in presently available devices or data processing systems. Thus, a substantial advancement of such devices or data processing systems by executing a method of an embodiment improves the usability, consumability, and the relevance of the forecast to a user's requirements.

The illustrative embodiments are described with respect to certain methods or techniques, algorithms, models, weights, values, events, functions, equations, exponents, conditions, curves, events, time-series data, anomalies, portions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
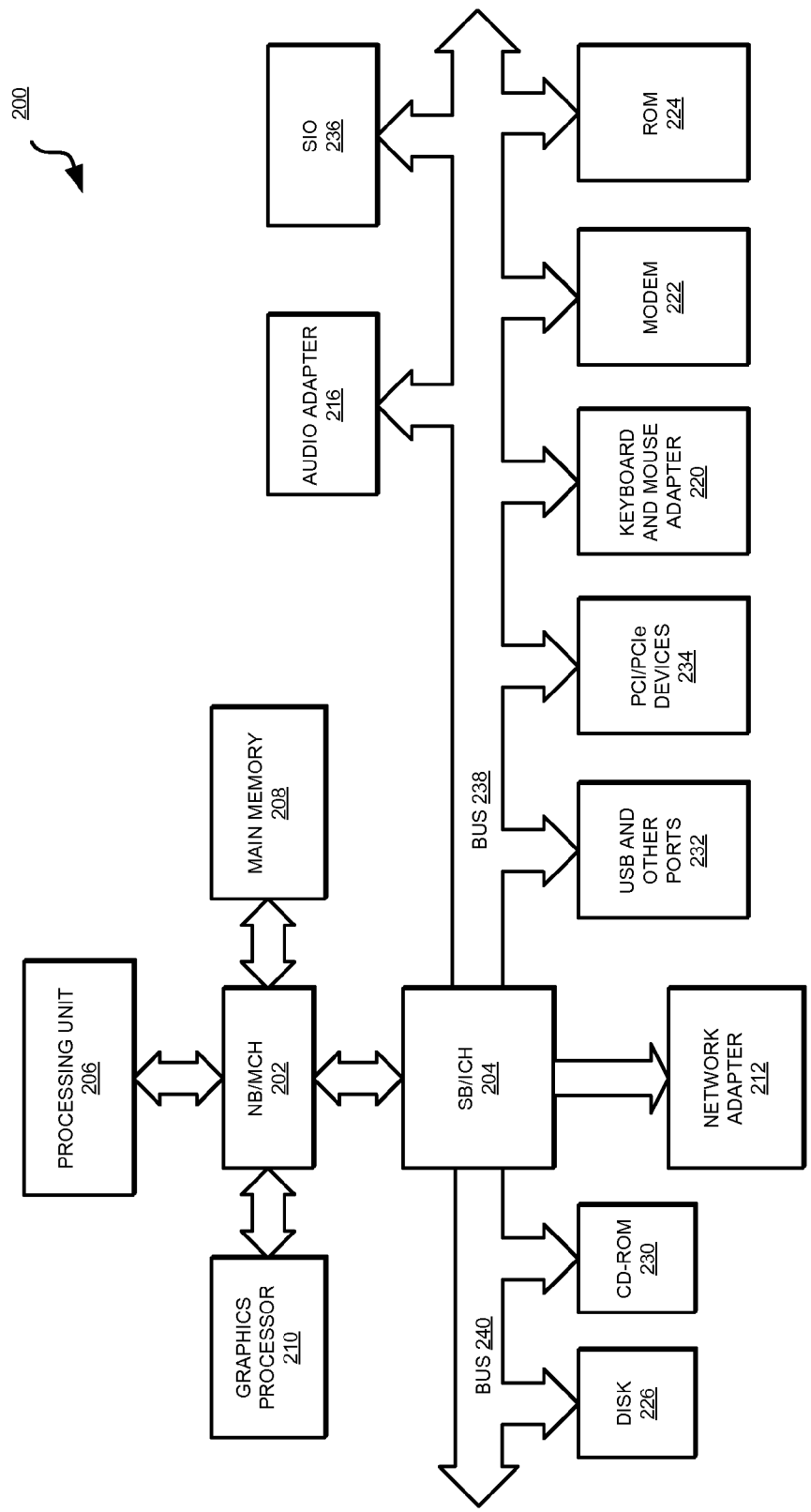
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for communicating over an overlay. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Data source 134 is an example source of an input time-series, such as a complex input time-series or a component thereof. Likewise, data source 113 is also an example source of an input time-series or a component thereof. For example, the data from sources 113 and 134 can together form a complex input time-series. Application 105 implements an embodiment described herein. Forecasters 107 is a set of forecasters from which a subset can be selected in a manner described herein. Application 105 selects a forecaster from forecasters 107, to produce a forecast output corresponding to a component of a complex time-series produces from sources 134 and 113. Forecast 117A is an example of such a forecast output. User 115 assigns weight 117B to forecast output 117A to indicate a relevance of, or a change in the relevance of, forecast output 117A.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
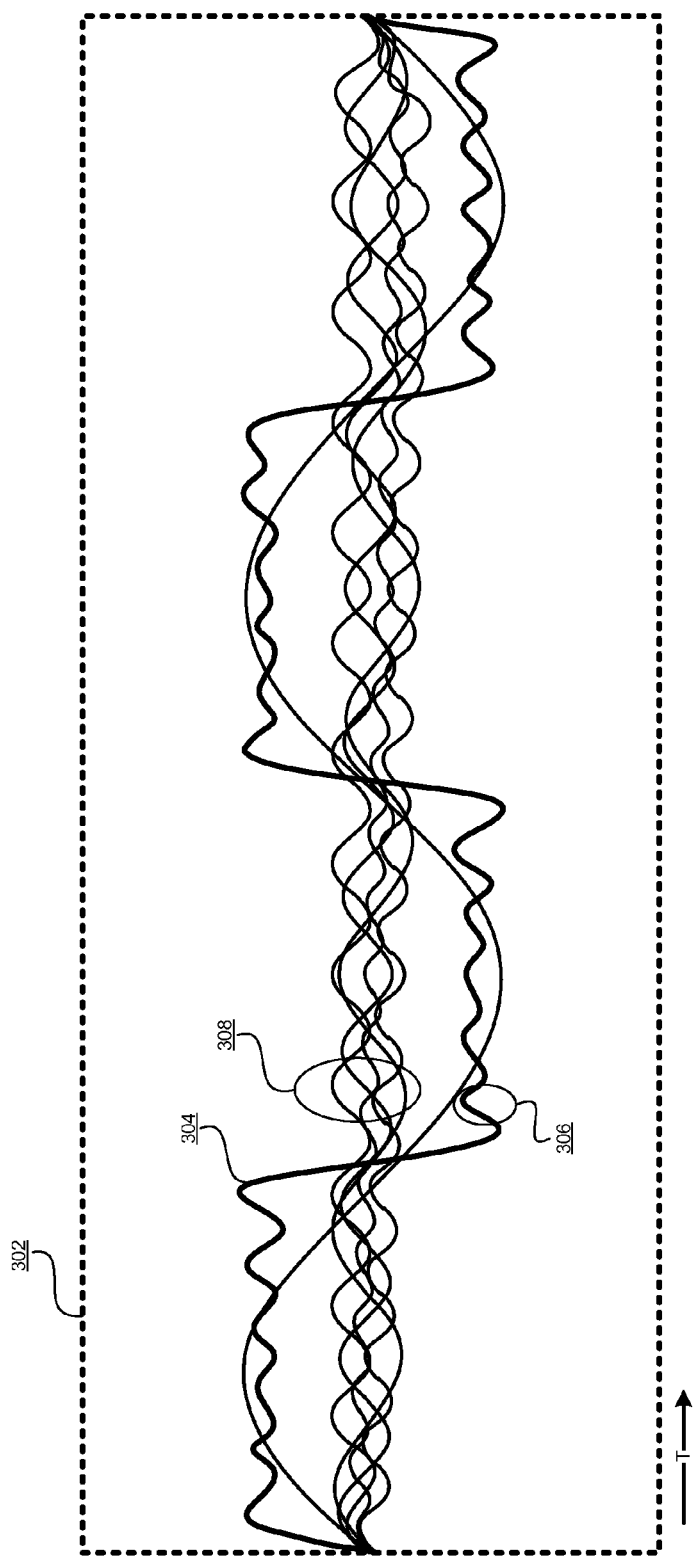
FIG. 3 depicts an example of a complex input time-series that can be decomposed for relevance-weighted forecasting in accordance with an illustrative embodiment.

With reference to FIG. 3, this figure depicts an example of a complex input time-series that can be decomposed for relevance-weighted forecasting in accordance with an illustrative embodiment. Graph 302 is a representation of example complex time-series 304, which can be produced from source 134 in FIG. 1, source 113 in FIG. 1, or a combination thereof.

Depicted waveform of complex time-series 304 or its constituent frequencies are only an illustrative example, and are not intended to be limiting on the illustrative embodiments. Consider, as an example, that application 105 receives as input a complex time-series, which can be represented as waveform 304. Waveform 304 has certain periodicity or seasonality, as evident by the crests and valleys of waveform 304 at certain intervals.

Other waveforms depicted in graph 302 are the constituent waveforms of the various frequencies that together form waveform 304. A point or portion on waveform 304, such as portion 306 over a certain period, is a result of combining the portions of all the various constituent frequency waveforms for the same period, to wit, portions 308. Other points on waveform 304 similarly result from combining the values of the constituent waveforms at the time of the point along timeline T.

The constituent waveforms of waveform 304 are not evident in the complex timeline that corresponds to waveform 304. They are depicted here only for illustrative purposes. Application 105 only receives a time-series that corresponds to waveform 304 in a time-based view along timeline T. The next question then is—which frequencies, in a frequency-view of waveform 304, are present in waveform 304?

Figure 4:
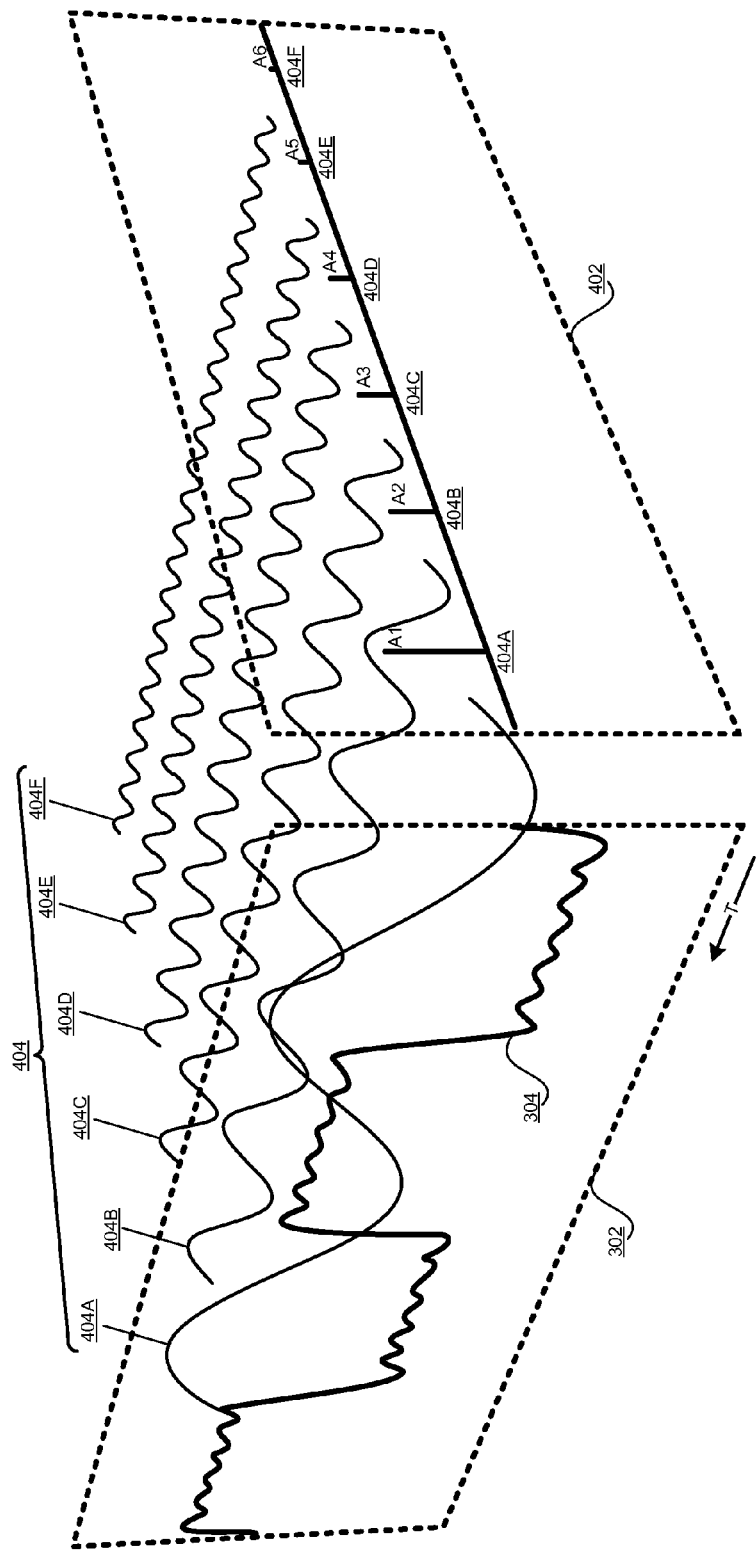
FIG. 4 depicts an example constituent frequencies in a decomposed complex time-series obtained in accordance with an illustrative embodiment.

With reference to FIG. 4, this figure depicts an example constituent frequencies in a decomposed complex time-series obtained in accordance with an illustrative embodiment. Time-based view 302 of waveform 304 is the same as in FIG. 3. A transformation applied to waveform 304 produces frequency-based view 402, which includes frequencies in group 404. Scale 406 is an amplitude scale of the frequencies appearing in group 404.

According to one example embodiment, the transformation applies Fourier transform to waveform 304 to determine the presence, or presence at an amplitude, of a constituent frequency. For example, the embodiment computes—

$$\hat{f}(\alpha) = \int_{-\infty}^{\infty} f(x)e^{-2i\pi x\alpha}dx$$

α is the constituent frequency to be searched in waveform 304. If frequency α is present in waveform 304, the above Fourier transform produces a greater than a threshold value, and vice-versa. Those of ordinary skill in the art will be able to adapt the above equation to detect the presence of frequency α, with a certain amplitude, in waveform 304, and the same is contemplated within the scope of the illustrative embodiments.

Using this transformation, an embodiment identifies example frequency 404A appearing in waveform 304 at amplitude A1, where the height of bar A1 in the bar graph on frequency-based view 402 represents the amplitude of frequency 404A. Likewise, example frequency 404B appearing in waveform 304 at amplitude A2, frequency 404C appearing in waveform 304 at amplitude A3, frequency 404D appearing in waveform 304 at amplitude A4, frequency 404E appearing in waveform 304 at amplitude A5, and frequency 404F appearing in waveform 304 at amplitude A6.

Note that the transformation may result in a set of constituent frequencies. An embodiment selects a subset of constituent frequencies, which participate in complex time-series represented by waveform 304, and which have amplitudes greater than a threshold amplitude. As depicted in this figure, the subset of the selected frequencies includes frequencies 404A-F.

Figure 5:
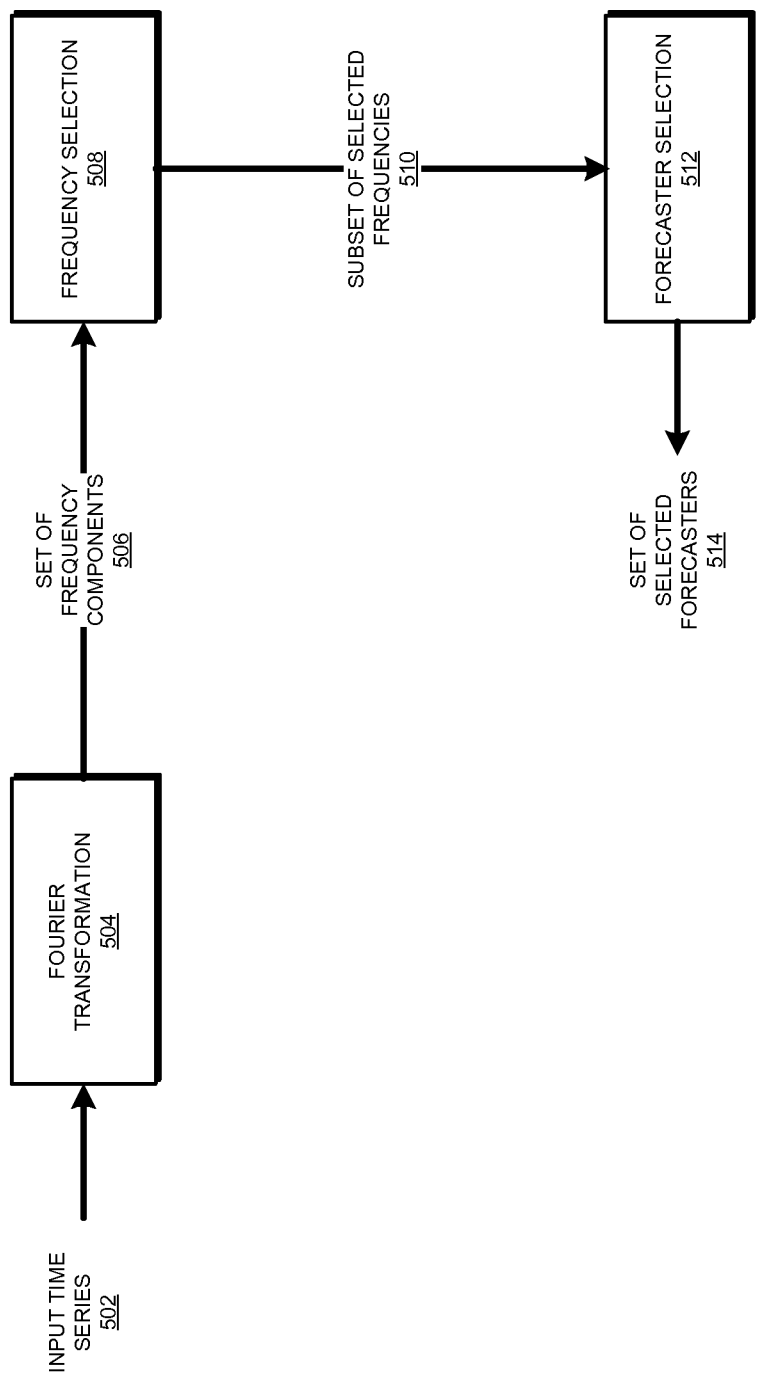
FIG. 5 depicts a block diagram of a process for producing components of a forecast output in accordance with an illustrative embodiment.

With reference to FIG. 5, this figure depicts a block diagram of a process for producing components of a forecast output in accordance with an illustrative embodiment. Input time-series 502 is an example complex time-series represented by a waveform in the manner of waveform 304.

Fourier transformation 504 produces set 506 of the frequency components of input time-series 502. Selection process 508 identifies subset 510 of selected frequencies from set 506. As described above, the selection in process 508 may be based on a threshold amplitude or other characteristics of a frequency in set 506. For example, an adaptation of an embodiment may select only those frequencies that fall within a specified range. Another adaptation of an embodiment may select only those frequencies that fall within a specified range and have an amplitude greater than a threshold amplitude. These examples of frequency selection are not intended to be limiting. From this disclosure, those of ordinary skill in the art will be able to conceive many other ways of selecting subset 510, and the same are contemplated within the scope of the illustrative embodiments.

Forecaster selection function 512 matches each selected frequency in subset 510 with a suitable forecaster and outputs set 514 of the corresponding selected forecasters. A selected forecaster in set 514 accepts a selected frequency from subset 510 as an input and produces a corresponding forecast output. The forecast output of a selected forecaster is a component in an overall forecast, as described elsewhere in this disclosure.

In one embodiment, forecaster selection function 512 is based on a Support Vector Machine (SVM). An SVM takes as an input a selected frequency from subset 510, and outputs a forecaster member of set 514.

A frequency in subset 510 can have anomalies. As described earlier, state-based forecasters are configured to forecast in the presence of anomalous data in a time-series. Accordingly, an embodiment selects a state based forecaster for a given frequency in subset 510.

Forecaster selection function 512 can be configured to select a forecaster based on the input, the duration of the desired forecast, the accuracy desired in the forecast, or some combination of these and other considerations that will be apparent from this disclosure to those of ordinary skill in the art. Some example manners of using the duration and accuracy as example considerations are described elsewhere in this disclosure, and other considerations are contemplated within the scope of the illustrative embodiments.

Figure 6:
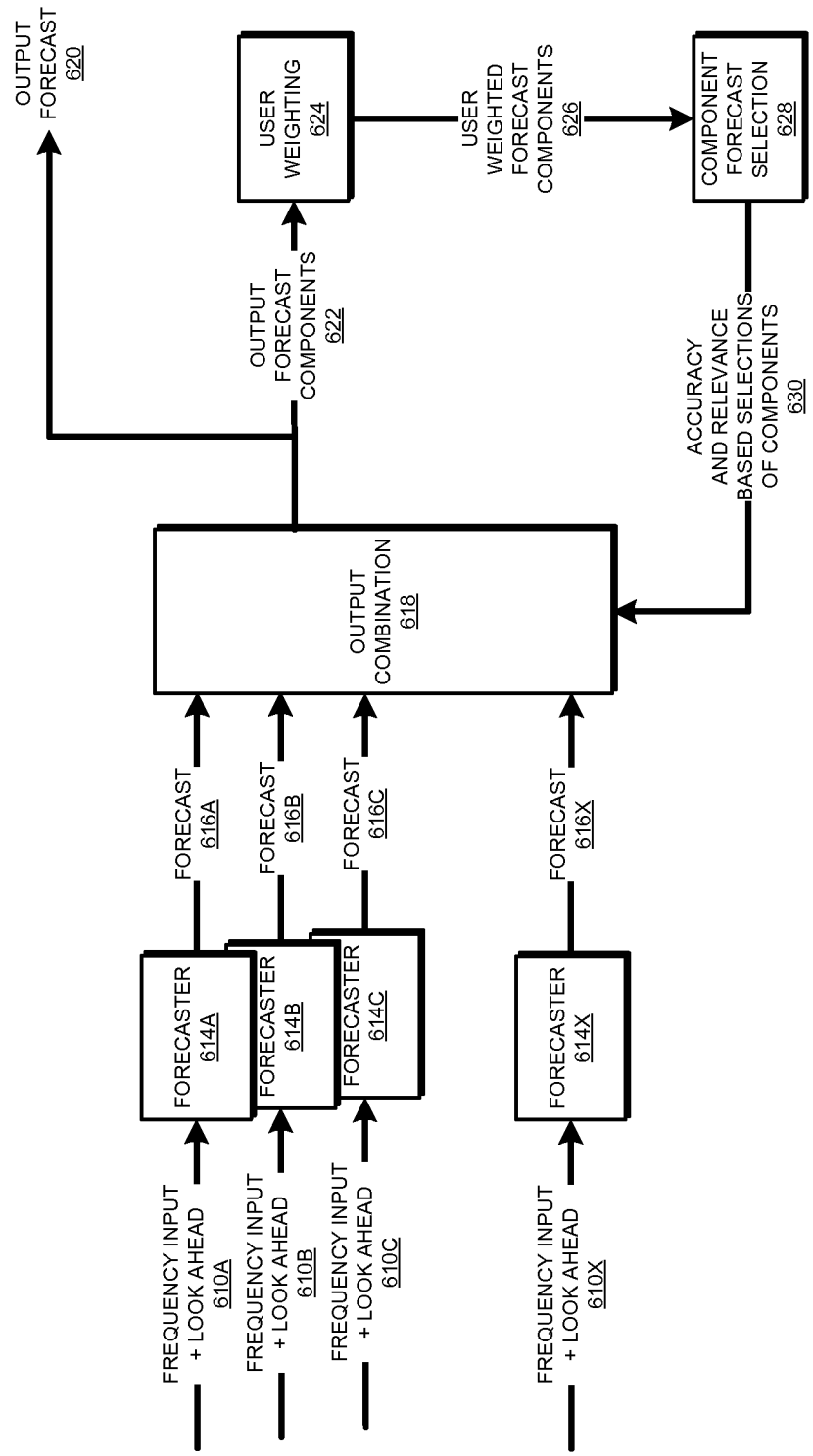
FIG. 6 depicts a block diagram of a process of producing and adjusting an overall output forecast according to the desired accuracy and relevance in accordance with an illustrative embodiment.

With reference to FIG. 6, this figure depicts a block diagram of a process of producing and adjusting an overall output forecast according to the desired accuracy and relevance in accordance with an illustrative embodiment. Forecasters 614A, 614B, 614C, through 614X are any number of forecasters produced in set 514 of selected forecasters in FIG. 5.

Frequency input 610A is a frequency in subset 510 of selected frequencies in FIG. 5, and corresponds to forecaster 614A. Similarly, frequency input 610B is a frequency in subset 510 of selected frequencies in FIG. 5, and corresponds to forecaster 614B. Frequency input 610C is a frequency in subset 510 of selected frequencies in FIG. 5, and corresponds to forecaster 614C. Likewise, frequency input 610X is a frequency in subset 510 of selected frequencies in FIG. 5, and corresponds to forecaster 614X.

Using inputs of frequency 610A and a specified look-ahead period, forecaster 614A outputs forecast 616A. Using inputs of frequency 610B and a same or different look-ahead period, forecaster 614B outputs forecast 616B. Using inputs of frequency 610C and a same or different look-ahead period, forecaster 614C outputs forecast 616C. Using inputs of frequency 610X and a suitable same or different look-ahead period, forecaster 614X outputs forecast 616X. Each of forecasts 616A-X is a component of an overall output forecast.

Output combination process 618 applies a selection process to forecasts 616A-X. The selection process selects all or some of the forecasts from the set of forecasts 616A-X based on a desired accuracy parameter, a desired relevance parameter, or both. The values of the desired accuracy parameter and the desired relevance parameter can be set initially and modified iteratively in process 618, in the manner described herein.

Output forecast 620 is the overall output forecast. Output forecast 620 is available for use in a system or process that expects a forecast based on input time-series 502 in FIG. 5.

An embodiment also makes component 622 of output forecast 620 available to weighting process 624. A user uses components 622 in weighting process 624 to assign weights corresponding to the relevance of various components 622 of output forecast 620.

In one example embodiment, components 622 are those forecasts from forecasts 616A-X that are combined in output forecast 620. In another example embodiment, components 622 are all forecasts from forecasts 616A-X with a suitable indicator indicating which of forecasts 6161A-X are combined in output forecast 620.

Weighting process 624 produces user-weighted forecast components 626. A user may chose to weight all or some of components 622, resulting in a composition of user-weighted forecast components 626 that is not necessarily the same as component 622.

Selection process 628 selects from user-weighted forecast components 626 some or all forecast components. The selection criteria of process 628 can be configured in a variety of ways. In one example embodiment, only those components 626 are selected whose weights exceed a threshold weight to indicate a greater than a threshold degree of relevance. In another embodiment, those component 626 are selected whose weight exceeds a weight threshold and whose accuracy exceeds an accuracy threshold. Many other ways of selecting some or all of user-weighted forecast components 626 at process 628 will be apparent from this disclosure, and the same are contemplated within the scope of the illustrative embodiments.

Selection 630 includes forecasts components that have been selected at process 628 according to the user-assigned weights, accuracy of those particular forecast components, or a combination thereof. Selection 630 serves as a feedback to combination process 618. Combination process 618 uses selection 630 to revise the accuracy parameter, the relevance parameter, or both for the next iteration of producing output forecast 620. Selection 630 is also usable at combination process 618 to change the selection of forecasts 616A-X that participate in the next iteration of output forecast 620.

Figure 7:
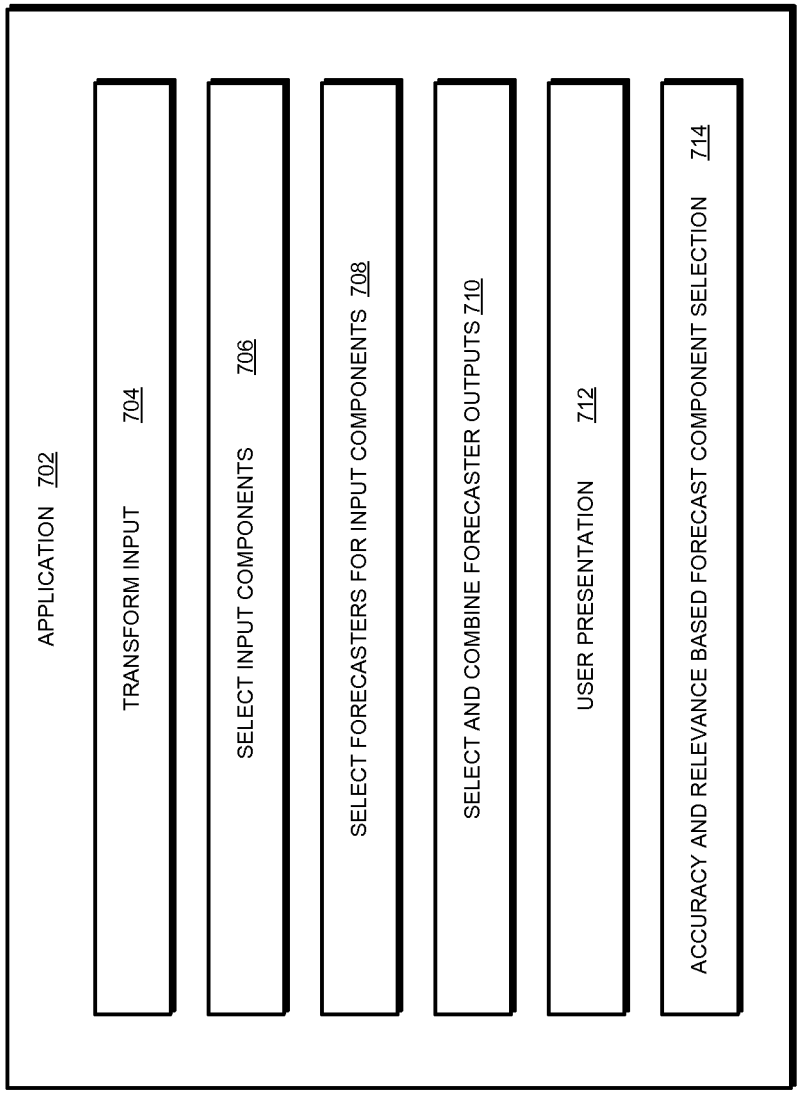
FIG. 7 depicts a block diagram of a configuration for relevance-weighted forecasting based on time-series decomposition in accordance with an illustrative embodiment.

With reference to FIG. 7, this figure depicts a block diagram of a configuration for relevance-weighted forecasting based on time-series decomposition in accordance with an illustrative embodiment. Application 702 is an example of application 105, in which an embodiment can be implemented.

Component 704 transforms a complex input time-series, such as to perform function 504 in FIG. 5. Component 704 produces a set of frequencies, such as set 506 in FIG. 5. Component 706 selects a subset of frequencies from the output set of component 704, such as by performing function 508 and producing subset 510 of selected frequencies in FIG. 5.

Component 708 selects a set of forecasters corresponding to the subset output from component 706, such as by performing function 512 and producing set 514 in FIG. 5. Component 710 selects and combines certain forecast components, such as by performing process 618 on forecasts 616A-X and producing output forecast 620 in FIG. 6.

Component 712 presents for relevance weighting the component forecasts of the output forecast produced from component 710. For example, component 712 presents components 622 in a user interface of weighting process 624 in FIG. 6.

Component 714 selects accuracy-weighted and/or relevance-weighted components after a user has assigned the weights to the output of component 712. For example, component 714 performs process 628 on user weighted forecast components 626 to produce selection 630 of the components. An output of component 714 form a feedback input to component 710 for a next iteration of producing an overall output forecast.

Figure 8:
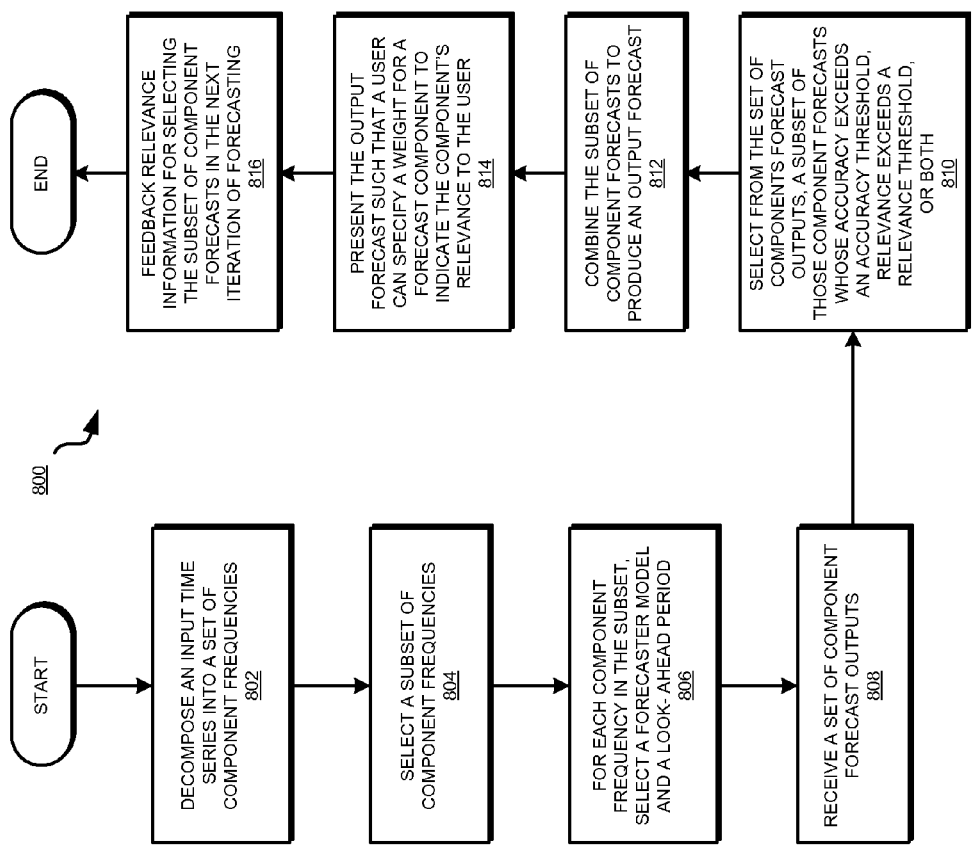
FIG. 8 depicts a flowchart of an example process for relevance-weighted forecasting based on time-series decomposition in accordance with an illustrative embodiment.

With reference to FIG. 8, this figure depicts a flowchart of an example process for relevance-weighted forecasting based on time-series decomposition in accordance with an illustrative embodiment. Process 800 can be implemented in application 702 in FIG. 7.

The application decomposes an input time-series into a set of component frequencies (block 802). The application selects a subset of the component frequencies (block 804). For each component frequency in the subset, the application selects a forecaster model and a look-ahead period (block 806).

The application receives a set of component forecast outputs (block 808). The application selects, from the set of component forecast outputs, a subset of those component forecast outputs whose accuracy meets exceeds an accuracy threshold, whose relevance meets or exceeds a relevance threshold, or both (block 810).

The application combines the subset selected in block 810 to produce an overall output forecast (block 812). The application presents the component forecasts from the subset used in block 812, to a user, in a manner such that the user can specify a weight for a component forecast to indicate the component's relevance to the user (block 814). In one embodiment, the user can also assign to a component a second weight indicative of the component forecast's accuracy relative to an accuracy desired by the user (block). Note that the user described herein can be a human, an application, a system, or a process within the scope of the illustrative embodiments.

The application feeds back the relevance and accuracy information for selecting the subset of component forecast outputs at block 810 in a next iteration of producing a forecast using process 800 (block 816). The application ends process 800 thereafter, or alternatively, re-enters (not shown) at block 802 for another iteration of forecasting.

Thus, a computer implemented method, system or apparatus, and computer program product are provided in the illustrative embodiments for relevance-weighted forecasting based on time-series decomposition. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for forecasting based on time-series decomposition, the method comprising:
   decomposing, using a processor and a memory, an input time-series into a set of constituent frequencies;
   selecting, for each constituent frequency in a subset of the set of constituent frequencies, a corresponding forecasting model in a subset from a set of forecasting models;
   selecting, from a set of component forecasts produced by the subset of forecasting models, a subset of component forecasts, wherein a component forecast in the subset of component forecasts is selected according to a component forecast selection condition; and
   outputting the subset of component forecasts to revise the forecast selection condition, wherein a revised forecast selection condition increases a relevance of a future subset of component forecasts.

2. The method of claim 1, further comprising:
receiving from an application a relevance weight, wherein the relevance weight is the component forecast selection condition.

3. The method of claim 2, wherein a user revises a previous relevance weight to form the relevance weight.

4. The method of claim 1, further comprising:
receiving from an application an accuracy weight, wherein the accuracy weight is the component forecast selection condition.

5. The method of claim 4, wherein a user revises a previous accuracy weight to form the accuracy weight.

6. The method of claim 1, further comprising:
receiving from an application a relevance weight and an accuracy weight, wherein the component forecast selection condition is a function of the relevance weight and the accuracy weight.

7. The method of claim 1, further comprising:
producing, by providing a constituent frequency from the subset of constituent frequencies as an input to a corresponding forecasting model in the subset of forecasting models, a component forecast in the set of component forecasts.

8. The method of claim 1, further comprising:
selecting the subset of the constituent frequencies according to a selection condition, wherein the selection condition specifies a minimum amplitude a frequency has to have in order to be selected into the subset of the constituent frequencies.

9. The method of claim 1, further comprising:
selecting, for a first constituent frequency in the subset of the constituent frequencies, a first forecasting model that is configured to forecast when an anomaly is present in the first constituent frequency.

10. The method of claim 1, further comprising:
transforming, as a part of decomposing, using Fourier transform, the input time-series, to detect a presence of a particular constituent frequency in the input time-series; and
adding, responsive to the particular frequency being present in the input time-series, the particular frequency as a constituent frequency in the set of constituent frequencies.

11. The method of claim 10, further comprising:
detecting, as a part of the transforming, the presence of the frequency at an amplitude.

12. The method of claim 1, wherein the decomposing uses a waveform representation of the input time-series, and wherein the decomposing produces a set of component data of the input time-series such that the set of the component data can be represented as the set of constituent frequencies.

13. The method of claim 1, wherein the method is embodied in a computer program product comprising one or more computer-readable storage devices and computer-readable program instructions which are stored on the one or more computer-readable tangible storage devices and executed by one or more processors.

14. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

15. A computer program product for forecasting based on time-series decomposition, the computer program product comprising:
one or more computer-readable tangible storage devices;
program instructions, stored on at least one of the one or more storage devices, to decompose, using a processor and a memory, an input time-series into a set of constituent frequencies;
program instructions, stored on at least one of the one or more storage devices, to select, for each constituent frequency in a subset of the set of constituent frequencies, a corresponding forecasting model in a subset from a set of forecasting models;
program instructions, stored on at least one of the one or more storage devices, to select, from a set of component forecasts produced by the subset of forecasting models, a subset of component forecasts, wherein a component forecast in the subset of component forecasts is selected according to a component forecast selection condition; and
program instructions, stored on at least one of the one or more storage devices, to output the subset of component forecasts to revise the forecast selection condition, wherein a revised forecast selection condition increases a relevance of a future subset of component forecasts.

16. The computer program product of claim 15, further comprising:
program instructions, stored on at least one of the one or more storage devices, to receive from an application a relevance weight, wherein the relevance weight is the component forecast selection condition.

17. The computer program product of claim 16, wherein a user revises a previous relevance weight to form the relevance weight.

18. The computer program product of claim 15, further comprising:
program instructions, stored on at least one of the one or more storage devices, to receive from an application an accuracy weight, wherein the accuracy weight is the component forecast selection condition.

19. The computer program product of claim 18, wherein a user revises a previous accuracy weight to form the accuracy weight.

20. The computer program product of claim 15, further comprising:
program instructions, stored on at least one of the one or more storage devices, to receive from an application a relevance weight and an accuracy weight, wherein the component forecast selection condition is a function of the relevance weight and the accuracy weight.

21. The computer program product of claim 15, further comprising:
program instructions, stored on at least one of the one or more storage devices, to produce, by providing a constituent frequency from the subset of constituent frequencies as an input to a corresponding forecasting model in the subset of forecasting models, a component forecast in the set of component forecasts.

22. The computer program product of claim 15, further comprising:
program instructions, stored on at least one of the one or more storage devices, to select the subset of the constituent frequencies according to a selection condition, wherein the selection condition specifies a minimum amplitude a frequency has to have in order to be selected into the subset of the constituent frequencies.

23. A computer system for forecasting based on time-series decomposition, the computer system comprising:
one or more processors, one or more computer-readable memories and one or more computer-readable storage devices;
program instructions, stored on at least one of the one or more storage devices for execution by at least one of the one or more processors via at least one of the one or more memories, to decompose, using a processor and a memory, an input time-series into a set of constituent frequencies;
program instructions, stored on at least one of the one or more storage devices for execution by at least one of the one or more processors via at least one of the one or more memories, to select, for each constituent frequency in a subset of the set of constituent frequencies, a corresponding forecasting model in a subset from a set of forecasting models;
program instructions, stored on at least one of the one or more storage devices for execution by at least one of the one or more processors via at least one of the one or more memories, to select, from a set of component forecasts produced by the subset of forecasting models, a subset of component forecasts, wherein a component forecast in the subset of component forecasts is selected according to a component forecast selection condition; and
program instructions, stored on at least one of the one or more storage devices for execution by at least one of the one or more processors via at least one of the one or more memories, to output the subset of component forecasts to revise the forecast selection condition, wherein a revised forecast selection condition increases a relevance of a future subset of component forecasts.

24. An apparatus for forecasting based on time-series decomposition, the apparatus comprising:
a processor decomposing an input time-series into a set of constituent frequencies;
a storage device storing a set of forecaster models from which, for each constituent frequency in a subset of the set of constituent frequencies, a corresponding forecasting model is selected in a subset;
the subset of forecasting models producing a set of component forecasts from which a subset of component forecasts is selected, wherein a component forecast in the subset of component forecasts is selected according to a component forecast selection condition; and
a user interface to which the subset of component forecasts is outputted to revise the forecast selection condition, wherein a revised forecast selection condition increases a relevance of a future subset of component forecasts.

25. A forecasting environment for forecasting based on time-series decomposition, the environment comprising:
a time-series decomposer decomposing an input time-series into a set of constituent frequencies;
a storage device storing a set of forecaster models from which, for each constituent frequency in a subset of the set of constituent frequencies, a corresponding forecasting model is selected in a subset;
the subset of forecasting models producing a set of component forecasts from which a subset of component forecasts is selected, wherein a component forecast in the subset of component forecasts is selected according to a component forecast selection condition; and
a user interface to which the subset of component forecasts is outputted to revise the forecast selection condition, wherein a revised forecast selection condition increases a relevance of a future subset of component forecasts.

* * * * *